United States Patent
Mukundala et al.

(10) Patent No.: US 10,825,116 B2
(45) Date of Patent: Nov. 3, 2020

(54) VEHICLE PARKING SPACE PROTECTOR AND ACCESS CONTROL BY A VEHICLE OPERATOR

(71) Applicant: Carrier Corporation, Jupiter, FL (US)

(72) Inventors: Sumanth Kumar Mukundala, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 404 days.

(21) Appl. No.: 15/906,754

(22) Filed: Feb. 27, 2018

(65) Prior Publication Data

US 2019/0197636 A1    Jun. 27, 2019

(30) Foreign Application Priority Data

Dec. 22, 2017 (IN) .............................. 201711046213

(51) Int. Cl.
| | |
|---|---|
| *G06K 5/00* | (2006.01) |
| *G07B 15/02* | (2011.01) |
| *G06Q 50/12* | (2012.01) |
| *G07B 15/04* | (2006.01) |
| *G06Q 10/02* | (2012.01) |

(Continued)

(52) U.S. Cl.
CPC .......... *G06Q 50/12* (2013.01); *E01F 13/042* (2013.01); *G06Q 10/02* (2013.01); *G06Q 30/0267* (2013.01); *G07B 15/04* (2013.01); *G08G 1/144* (2013.01); *G08G 1/146* (2013.01); *G08G 1/149* (2013.01)

(58) Field of Classification Search
USPC ................................. 235/382, 384, 451, 492
See application file for complete search history.

(56) References Cited

U.S. PATENT DOCUMENTS

| | | | |
|---|---|---|---|
| 4,858,382 A * | 8/1989 | Ellgass ................. | E01F 13/085 49/35 |
| 6,937,139 B2 | 8/2005 | Nuesser et al. | |

(Continued)

FOREIGN PATENT DOCUMENTS

| | | |
|---|---|---|
| CA | 2957914 A1 | 2/2016 |
| CN | 201306026 Y | 9/2009 |

(Continued)

OTHER PUBLICATIONS

"Parking", BlueID, Accessed on Dec. 18, 2017 at https://www.blueid.net/parking-2/(5 pp.).

(Continued)

*Primary Examiner* — Tuyen K Vo
(74) *Attorney, Agent, or Firm* — Cantor Colburn LLP

(57) ABSTRACT

Disclosed is a method for accommodating parking requirements of a vehicle operator parking a vehicle at a parking spot, including: receiving, in a parking block assembly disposed in an egress area of a parking spot of a parking lot, authorized instructions from a mobile device of the vehicle operator to position a parking block in lowered position, positioning the parking block of the a parking block assembly in the lowered position, and wherein the authorized instructions are provided to the mobile device in advance and enable control of the parking block assembly only during a duration of a stay at the parking spot for the vehicle.

18 Claims, 4 Drawing Sheets

(51) Int. Cl.
*G06Q 30/02* (2012.01)
*G08G 1/14* (2006.01)
*E01F 13/04* (2006.01)

(56) References Cited

U.S. PATENT DOCUMENTS

| | | | |
|---|---|---|---|
| 2002/0135461 A1 | 9/2002 | Nuesser et al. | |
| 2002/0162276 A1* | 11/2002 | Biton | E01F 13/085 |
| | | | 49/49 |
| 2006/0227010 A1* | 10/2006 | Berstis | G08G 1/14 |
| | | | 340/932.2 |
| 2009/0046451 A1* | 2/2009 | Hoover | E01F 13/044 |
| | | | 362/183 |
| 2011/0102197 A1* | 5/2011 | Herwich | E01F 9/559 |
| | | | 340/932.2 |
| 2012/0044046 A1* | 2/2012 | Al-Jafar | E01F 13/085 |
| | | | 340/5.2 |
| 2013/0094902 A1 | 4/2013 | Chang | |
| 2013/0287491 A1* | 10/2013 | Petryshyn | E01F 13/085 |
| | | | 404/6 |
| 2014/0372185 A1 | 12/2014 | Ganot | |
| 2015/0237167 A1* | 8/2015 | Blanco | H04L 67/025 |
| | | | 707/722 |
| 2016/0042575 A1 | 2/2016 | Ganguly et al. | |
| 2020/0105140 A1* | 4/2020 | Wang | G08G 1/146 |

FOREIGN PATENT DOCUMENTS

| | | |
|---|---|---|
| CN | 101581158 A | 11/2009 |
| CN | 103132763 A | 6/2013 |
| CN | 203066574 U | 7/2013 |
| CN | 103410365 A | 11/2013 |
| CN | 103713528 A | 4/2014 |
| CN | 103924808 A | 7/2014 |
| CN | 104727614 A | 6/2015 |
| CN | 104847150 A | 8/2015 |
| CN | 104975740 A | 10/2015 |
| CN | 105046790 A | 11/2015 |
| CN | 105421856 A | 3/2016 |
| CN | 205077936 U | 3/2016 |
| CN | 105545049 A | 5/2016 |
| CN | 105714711 A | 6/2016 |
| CN | 205296004 U | 6/2016 |
| CN | 205348042 U | 6/2016 |
| CN | 205369097 U | 7/2016 |
| CN | 205370069 U | 7/2016 |
| CN | 105887718 A | 8/2016 |
| CN | 205422097 U | 8/2016 |
| CN | 106522133 A | 3/2017 |
| CN | 107142867 A | 9/2017 |
| CN | 107146458 A | 9/2017 |
| DE | 10032916 A1 | 1/2002 |
| DE | 102012005573 A1 | 9/2013 |
| DE | 102015204368 A1 | 9/2016 |
| EP | 1301375 A1 | 4/2003 |
| EP | 2867866 A1 | 5/2015 |
| JP | 2004502061 A | 1/2004 |
| WO | 0202892 A1 | 1/2002 |
| WO | 2013105067 A1 | 7/2013 |
| WO | 2016025513 A1 | 2/2016 |
| WO | 2016067015 A2 | 5/2016 |

OTHER PUBLICATIONS

"Solid Steel TurboLock Bluetooth® TL-500PR Parking Lock w/ Alarm & App—Protect your Parking Space; Easy Installation", TurboLock.com, Accessed on Dec. 18, 2017 at http://turbolock.com/product/tl-500pr-bluetooth-parking-barrier/ (5 pp.).

European Patent Office, Extended European search report, Application No. 18213386.8-1009, dated May 20, 2019 (10 pp.).

* cited by examiner

VEHICLE PARKING SPACE PROTECTOR AND ACCESS CONTROL BY A VEHICLE OPERATOR

CROSS-REFERENCE TO RELATED APPLICATIONS

This application claims the benefit of Indian Patent Application Number 201711046213, filed on Dec. 22, 2017, which is incorporated herein by reference in its entirety.

BACKGROUND

Exemplary embodiments pertain to the art of monitoring parking spaces at hotel parking lots and more specifically to providing a vehicle parking space protector and access control.

Vehicle operators such as hotel guests and third parties who drive vehicles while staying at or visiting a hotel or the like, such as when arriving at or departing from the hotel, typically park their vehicles at any available parking spot in a hotel parking lot as there is no parking reservation for current hotel guests. Drawbacks of this process are that an outside person can take spots needed for hotel guests. Parked guest vehicles can be easily stolen from the hotel parking lots unless the spots are visually monitored. In addition, if a guest parks poorly and, for example, is not parked far enough within a spot, damage and inconvenience may result.

BRIEF DESCRIPTION

Disclosed is a parking system for parking a vehicle of a vehicle operator, comprising: a parking block assembly disposed on parking lot, the parking lot including a parking spot for parking the vehicle, wherein the parking spot includes an egress area and a parking area and the movable parking block is disposed in the egress area, the parking block assembly including: a parking block, and a lift mechanism supporting the parking block at the egress area, the lift mechanism positioning the parking block in a lowered position being proximate a ground level and a raised position being distal the ground level, a block controller, the block controller being an electronic controller that controls the lift mechanism to position the parking block in the lowered position and the raised position, a first sensor controlled by the block controller, the first sensor being a proximity sensor for sensing when a vehicle is in the egress area and/or the parking area, a first transceiver controlled by the block controller, the first transceiver electronically communicating with a mobile device that is within range of the first transceiver, the mobile device being a mobile telecommunications device for the vehicle operator, wherein the parking block assembly receives authorized instructions to position the parking block in the lowered position from the mobile device of the vehicle operator, and thereafter positions the parking block in the lowered position.

In addition to the above disclosed features, or as an alternative, the lift mechanism includes a base fixed to the egress area and a scissor lift connecting the base and the parking block.

In addition to the above disclosed features, or as an alternative, the first transceiver is a radio frequency (RF) transceiver that communicates with an NFC transceiver in the mobile device.

In addition to the above disclosed features, or as an alternative, the first transceiver is a Bluetooth Low Energy (BTLE) transceiver that communicates with a BTLE transceiver in the mobile device.

In addition to the above disclosed features, or as an alternative, the system including: a logistics controller, being an electronic controller that communicates with the mobile device, and a second transceiver controlled by the logistics controller, the second transceiver electronically communicating with the mobile device, the logistics controller transmitting credential data to the mobile device for processing on a parking application on the mobile device, the parking application being a software application that controls the parking block assembly, and wherein the authorized instructions are provided in advance to the mobile device by the logistics controller.

In addition to the above disclosed features, or as an alternative, the logistics controller is a hotel logistics controller for a hotel, the hotel logistics controller 142 enables the parking application to control the parking block assembly when the hotel logistics controller verifies the vehicle operator has an active reservation in at least one room in the hotel.

In addition to the above disclosed features, or as an alternative, the hotel logistics controller disables the parking application from controlling the parking block assembly when the hotel logistics controller verifies the vehicle operator is without an active reservation of at least one room in the hotel.

In addition to the above disclosed features, or as an alternative, prior to receiving authorized instructions from the mobile device, the parking block assembly applies RF protocols to advertise to and initiate communication with the mobile device.

In addition to the above disclosed features, or as an alternative, upon positioning the parking block in the lowered position, the parking block assembly: senses that no vehicle is initially in the parking area, senses when the vehicle is in the parking area and not in the egress area, and positions the parking block in the raised position.

In addition to the above disclosed features, or as an alternative, upon positioning the parking block in the lowered position, the parking block assembly: senses that the vehicle is initially in the parking area, senses when the vehicle is in neither the parking area nor the egress area, and positions the parking block in the raised position.

In addition to the above disclosed features, or as an alternative, upon positioning the parking block in the lowered position, the parking block assembly: senses the vehicle is in the egress area for a pre-determined time-period, and electronically transmits, at the end of the predetermined time-period, a warning to the mobile device that the vehicle is improperly positioned within the parking spot.

In addition to the above disclosed features, or as an alternative, the parking block assembly includes an audible alarm controlled by the block controller, and wherein after sensing for a second predetermined time-period that the vehicle remains in the egress area, the parking block assembly sounds the audible alarm.

In addition to the above disclosed features, or as an alternative, upon positioning the parking block in the lowered position, the parking block assembly: senses, for a third predetermined time-period, that the vehicle is neither in the parking area nor the egress area, and electronically transmits, at the end of the second predetermined time-period, a warning to the mobile device that the parking block is going to be raised; and positioning, at the end of a third predetermined time-period, the parking block in the raised position.

In addition to the above disclosed features, or as an alternative, the parking block assembly includes an audible alarm controlled by the block controller, the audible alarm is controlled to sound prior to positioning the parking block in the raised position or lowered position.

In addition to the above disclosed features, or as an alternative, the parking bock assembly includes a sensor controlled by the block controller, the sensor measures either or both of biased movement or applied force and the audible alarm is controlled to sound upon a sensing biased movement or applied force above a predetermined threshold.

In addition to the above disclosed features, or as an alternative, the parking block assembly includes a third transceiver controlled by the block controller, the third transceiver being a wired or RF transceiver, wherein the parking block assembly electronically communicates with the logistics controller over an Ethernet network when a parking bock is positioned in the raised or lowered position responsive to receiving instructions from the parking application.

In addition to the above disclosed features, or as an alternative, the parking block assembly receives from the mobile device an identity of the vehicle operator using the parking application, and the parking block assembly communicates the identity of the vehicle operator to the logistics controller over the Ethernet network when communicating that a parking bock is raised or lowered responsive to a command from the parking application.

In addition to the above disclosed features, or as an alternative, upon the parking block assembly sensing a vehicle in the parking spot for more than a fourth predetermined time-period, the parking block assembly electronically communicates a warming message to the logistics controller over the network.

In addition to the above disclosed features, or as an alternative, the parking lot includes a plurality of parking spots each with a parking block assembly, and wherein the logistics controller authorizes a vehicle operator to control a parking block assembly for parking a vehicle in a parking spot only when not more than a predetermined number of other parking block assemblies have been controlled by the vehicle operator to park a vehicle, unless at least one of the other parking block assemblies has been further controlled to remove a vehicle.

Further disclosed is method for accommodating parking requirements of a vehicle operator parking a vehicle at a parking spot, comprising: receiving, in a parking block assembly disposed in an egress area of a parking spot of a parking lot, authorized instructions from mobile a device of the vehicle operator to position a parking block in lowered position, positioning the parking block of the a parking block assembly in the lowered position, and wherein the authorized instructions are provided to the mobile device in advance and enable control of the parking block assembly only during a duration of a stay at the parking spot for the vehicle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
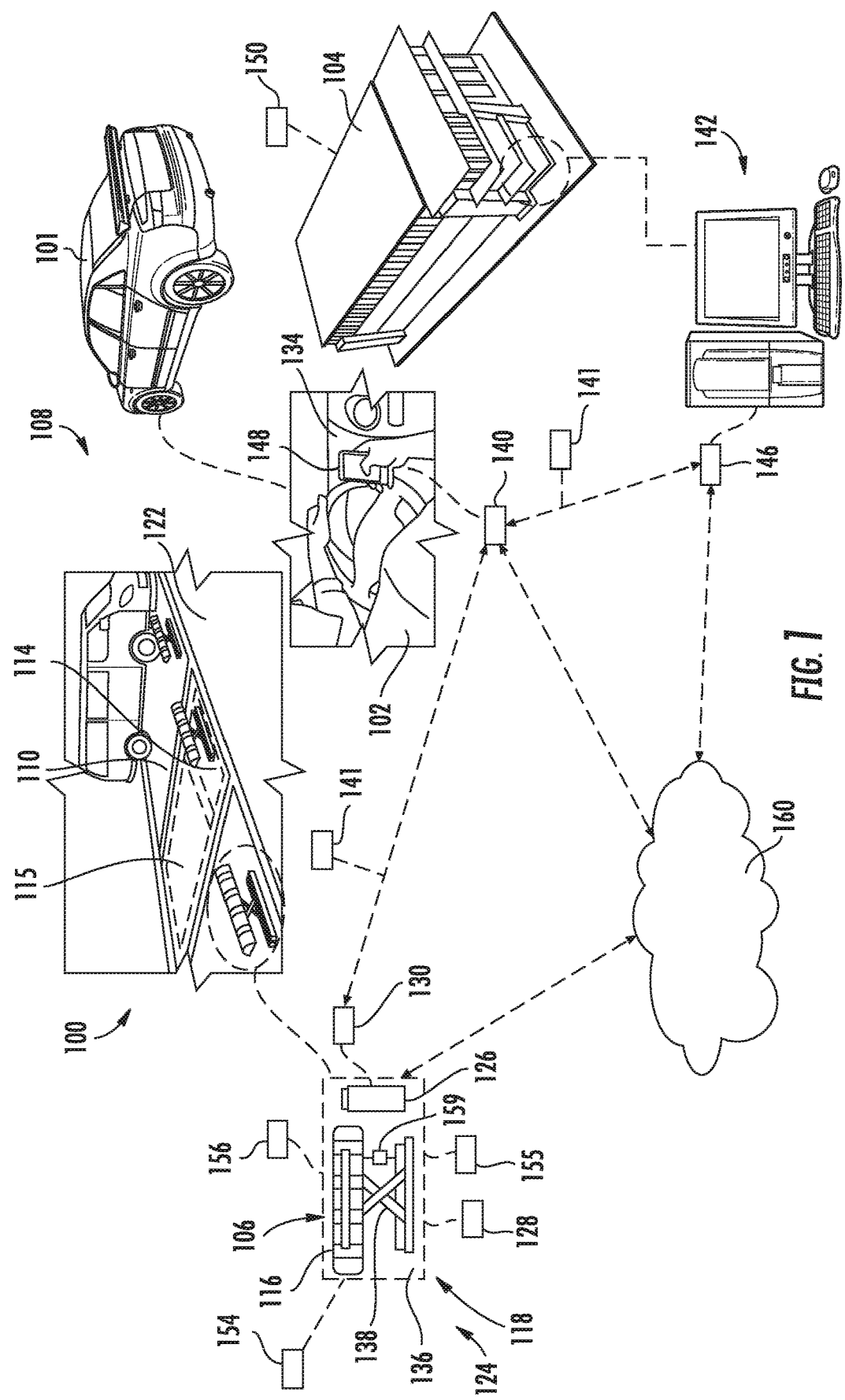
FIG. 1 illustrates a parking system for accommodating parking a vehicle of a guest of a hotel according to an embodiment.

Turning to FIG. 1, illustrated is a parking system 100 for parking a vehicle 101 of a vehicle operator 102 which may be a guest of a hotel 104 according to an embodiment. A parking block assembly 106 may be disposed on a parking lot 108, the parking lot 108 including a parking spot 110 for parking the vehicle 101. The parking spot 110 may include an egress area 114 and a parking area 115 and the parking block assembly 106 may be disposed in the egress area 114.

The parking block assembly 106 may include a parking block 116, and a lift mechanism 118 supporting the parking block 116 at the egress area 114. The lift mechanism 108 may selectively position the parking block 116 in a lowered position (not illustrated) that is proximate a ground level 122 and a raised position 124 that is distal the ground level 122. The lowered position may enable the vehicle 101 to drive into and out of the parking area 115 of the parking spot 110 and the raised position prevents the vehicle 101 from entering or, optionally, leaving the parking area 115 of the parking spot 110. The lowering and raising of the parking block 106 is discussed in further detail below.

The parking block assembly 106 may include a block controller 126. The block controller 126 may be an electronic controller that controls the lift mechanism 118 to selectively position the parking block 116 in the lowered position 120 and the raised position 124. The block controller 126, and all controllers identified herein, may include typical microprocessors, circuit substrates, read only memory, random access memory, flash memory, serial ports, firmware and software, user interfaces, which if exposed to weather are weather proof, which may be controllable by hand-held or stationary devices, etc., and may include other such electronic components and implements known in the art.

The parking block assembly 106 may include a sensor 128 controlled by the block controller 126. The sensor 128 may be an electronic proximity sensor for sensing when a vehicle 101 is in the egress area 114 and/or the parking area 115. For example, the sensor 128 may be an ultrasonic sensor directed at the parking spot 110 where the sensor 128 may transmit a pulse of energy and monitor for reception of reflections of the transmitted pulse. The assembly 106 may use the reflection to calculate a distance to an object which may be a parked vehicle 101. Alternatively the absence of a reflection may be interpreted as evidence of an absence of a present vehicle 101. Other types of sensors in the assembly 106 may include a ground inductive loop sensor or other sensors for detecting a presence or confirm an absence of a vehicle 101.

The parking block assembly 106 may further include a first transceiver 130 controlled by the block controller 126. The first transceiver 130 may electronically communicate with a mobile device 134 that is within range, i.e., close in distance, to the parking block assembly 106. The mobile device 134 may be a mobile telecommunications device for the guest 102. For example, the mobile device 134 may be a cellular phone, such as a smart phone. It is to be appreciated that the controller 126, the sensor 128, and the first transceiver 130, and/or features thereof, may be on an integrated circuit board (ICB) and/or an integrated chip (IC) on the ICB in the parking block assembly 106.

Figure 2:
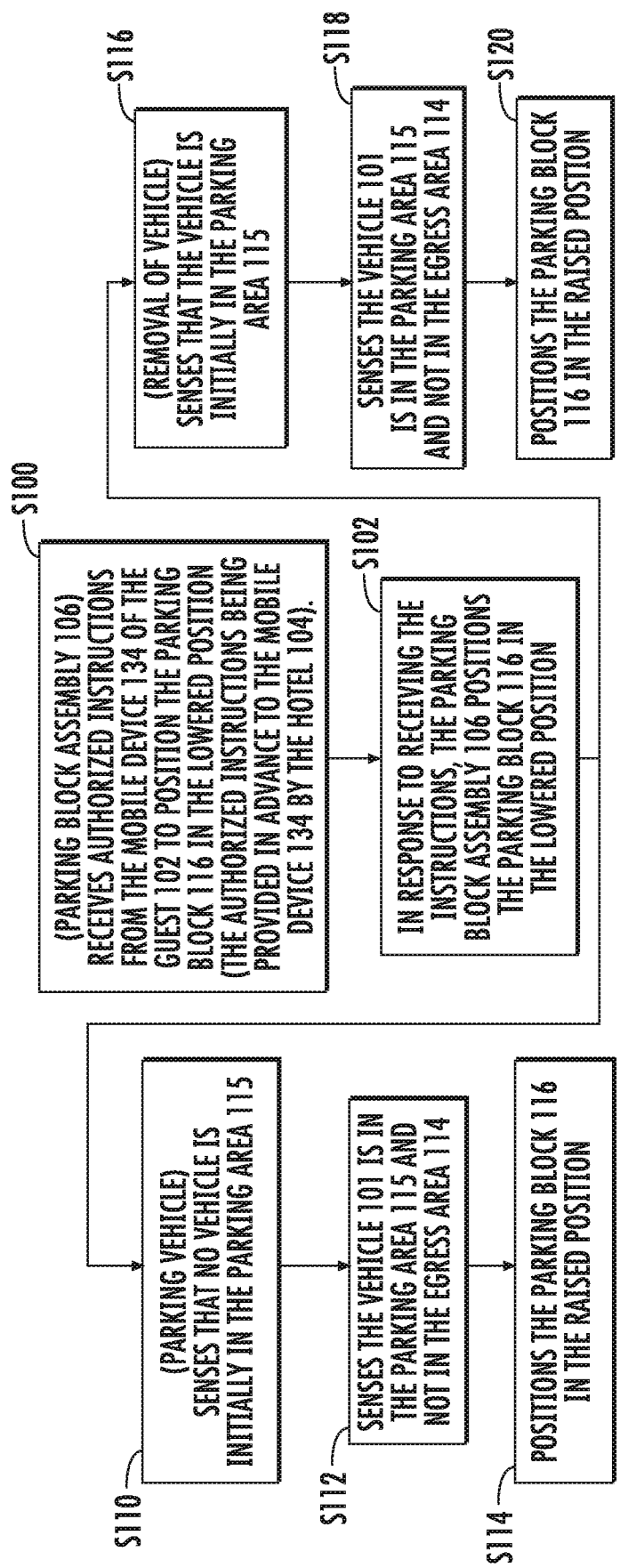
FIG. 2 illustrates a method for accommodating parking a guest of a hotel according to an embodiment.

As illustrated in FIG. 2, at S100 the parking block assembly 106 may receive credential data 141 representing authorized instructions from the mobile device 134 of the guest 102 to position the parking block 116 in the lowered position. The credential data 141 may include a mobile credential downloaded to the mobile device 134, e.g., from a hotel logistics controller 142 (discussed in greater detail below). The credential data 141 may specify which parking spot(s) 110 in which the guest 102 has been permitted to park. The credential data 141 may be structured and populated such that a parking block 116 at the particular spot(s) 110 are activated while others are not, and only during the duration that the guest 102 stays at the hotel 104.

Alternatively, the credential data 141 may be structured and populated to provide permission to any number of parking spot(s) 110 in a parking lot 108. Once a guest 102 selects a parking spot 110 in which to park, the guest 102 may not be allowed to select a different parking spot 110 unless the guest 120 vacates the parking spot 110 and then, during the duration of stay at the hotel 104, the guest 102 returns to the parking lot 108 to select a different and available parking spot 110.

To select a parking spot 110 the parking block 106 may electronically advertise a unique identifier, e.g., parking spot "110", and such advertisement may be viewable on the mobile device 134 of the guest 102. The guest 102 may select the parking spot 110 and then actuate the parking block 106 and then park their vehicle 101. Alternatively the mobile device 134 phone could indicate the parking spot 110 in which the guest 102 is able to park, and the guest 102 may only be able to actuate the parking block 106 associated with that parking spot 110.

More specifically, the credential data 141 may be of a form of a digital certificate that is encrypted or signed with a method well known in the art of credentialing. Additionally, the credential data 141 could indicate the beginning and ending dates of a hotel reservation, in which case the parking block 106 may prohibit actuation outside of the reservation period.

The authorized instructions may be provided in advance to the mobile device 134 by the hotel 104. In response to receiving the instructions, at S102 the parking block assembly 106 may position the parking block 116 in the lowered position.

As illustrated in FIG. 1, the lift mechanism 118 may include a base 136 fixed to the egress area 114. In addition, the lift mechanism may include 118 a scissor lift 138 that connects the base 136 and the parking block 116. Other lift mechanisms are within the scope of the disclosure.

The first transceiver 130 may be a radio frequency (RF) transceiver. The first transceiver 130 may apply NFC protocols to communicate with an NFC transceiver 140 in the mobile device 134. According to the disclosure, the first transceiver 130 may be a Bluetooth Low Energy (BTLE) transceiver that may communicate with a BTLE transceiver 140 in the mobile device 134.

The system 100 may include a logistics controller 142, which may be a hotel logistics controller for the hotel 104, and which may be an electronics controller that communicates with the mobile device 134. The hotel logistics controller 142 may involve, for example, the reservation, security and other logistical operations of the hotel 104. The hotel logistics controller 142 may include a second transceiver 146. Telecommunication capabilities through the hotel logistics controller 142 with the second transceiver 146 may include NFC, radio frequency (RF) such as Wireless Ethernet, etc. With the second transceiver 146, the hotel logistics controller 142 may electronically communicate with the mobile device 134.

The hotel logistics controller 142 could also be on a remote server accessible via an Ethernet network, such as a cloud-type service accessible over the World Wide Web 160. The mobile device 134 may communicate with the hotel logistics controller 142 via web services of typical internet connections such as secure socket layer/secure hypertext transfer protocol (SSL/HTTPS) and using networks such as cellular, Wi-Fi, etc. The hotel logistics controller 142 may be a single server on property, a server on property along with one or more cloud servers, or, yet alternatively, all servers may be in the cloud.

In obtaining authorization to control a parking block assembly 106, the hotel logistics controller 142 may transmit a parking application 148 to the mobile device 134 prior to when the guest 102 parks the vehicle 101. The parking application 148 may also be a hotel loyalty application, available via an application store such as available through Google (https://play.google.com/store/), Microsoft (https://www.microsoft.com/en-us/store/) or Apple, with voice recognition functionality for communicating with the parking block 106. The parking application 148 may be a software application authorized by the hotel logistics controller 142 for controlling the parking block assembly 106. The hotel logistics controller 142 may enable the parking application 148 to control the parking block assembly 106 when the hotel logistics controller 142 determines the hotel guest 102 has an active reservation in at least one room 150 in the hotel 104. On the other hand, the hotel logistics controller 142 may disable the parking application 148 from controlling the parking block assembly 106 when the hotel logistics controller determines the hotel guest 104 is without an active reservation of at least one room 150 in the hotel 104.

More specifically, when the mobile device 134 is within range of the parking block assembly 106, the parking block assembly 106 may apply RF protocols to advertise to and communicate with the mobile device 134. The parking block assembly 106 may receive instructions from the mobile device 134 via the parking application 148 to position the parking block 116 to the lowered position.

For a situation where the vehicle 101 is being parked in the parking spot 110, upon receiving authorized instructions to lower the parking block 116, at S110 the parking block assembly 106 may sense that no vehicle is initially in the parking area 115. At S112 the parking block assembly 106 senses when the vehicle 101 is in the parking area 115 and not in the egress area 114. At S114 positions the parking block 116 in the raised position. That is, optionally, when the vehicle is correctly parked in the parking spot 106, the parking block 116 is raised.

For a situation where the vehicle 101 is being removed from the parking spot 110, upon receiving authorized instructions to lower the parking block 116, at S116 the parking block assembly 106 senses that the vehicle 101 is initially in the parking area 115.

At S118 the parking block assembly 116 senses when the vehicle 101 is in neither the parking area 115 nor the egress area 114 At S120, the parking block assembly 106 positions the parking block 116 in the raised position. That is, when the parking block 116 is raised when the vehicle 101 has cleared the parking spot 110.

In an embodiment where the parking block 116 is only raised when no vehicle 101 is in a parking spot, the parking block 116 may be lowered (i) at S102 after a first authentication of the mobile device 134 at S100, and (ii) when the vehicle 101 is first parked. Further, when the vehicle 101 moves to leave the spot 101 as sensed at S118 the operation of moving the parking block 116 back into the raised position at S120 may be automatic, e.g., an additional authentication process would not be required to raise the block. However, in the alternate embodiment where the parking block 116 is moved to the raised position at S114 once a vehicle 101 is parked in the spot 110, then a second authentication of the mobile device 134 may be required in order to lower the parking block 116 via steps S100, S102, et. seq., to remove the vehicle from the spot 110.

Figure 3:
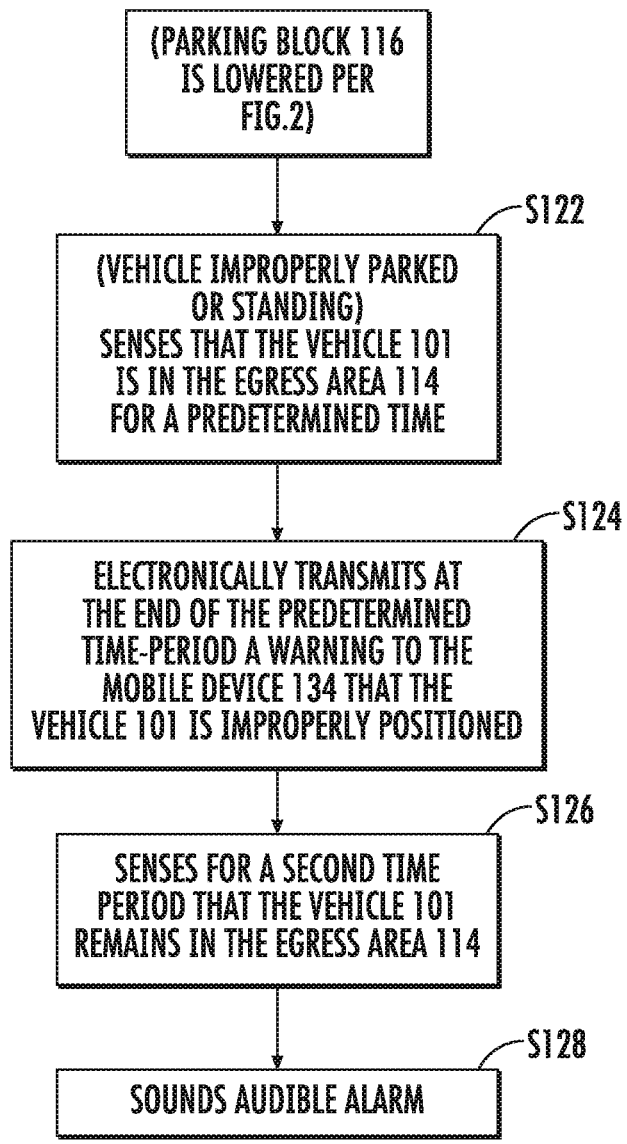
FIG. 3 illustrates a method for accommodating parking a guest of a hotel according to an embodiment.

Turning to FIG. 3, for a situation where the vehicle 101 is improperly parked or standing in the egress area 114 when the parking block 116 in the lowered position, at S122 the parking block assembly 106 senses that the vehicle 101 is in the egress area 114 for a predetermined time-period, e.g. two minutes. At S124 the parking block assembly 106 electronically transmits at the end of the predetermined time-period a warning to the mobile device 134 that the vehicle 101 is improperly positioned within the parking spot 110. This applies for parking or removing the vehicle 101 from the parking spot 110 as in either situation the vehicle would be prevented from the parking block 116 from being positioned in the raised position.

The parking block assembly 106 includes an audible alarm 154 controlled by the block controller 126. At S126 the parking block assembly 106 senses for a second predetermined time-period, such as one (1) additional minute, that the vehicle 101 remains in the egress area 114, and at S128 the parking block assembly 106 sounds the audible alarm 154. Accordingly, nearby hotel attendants may attend to an improperly parked vehicle.

Figure 4:
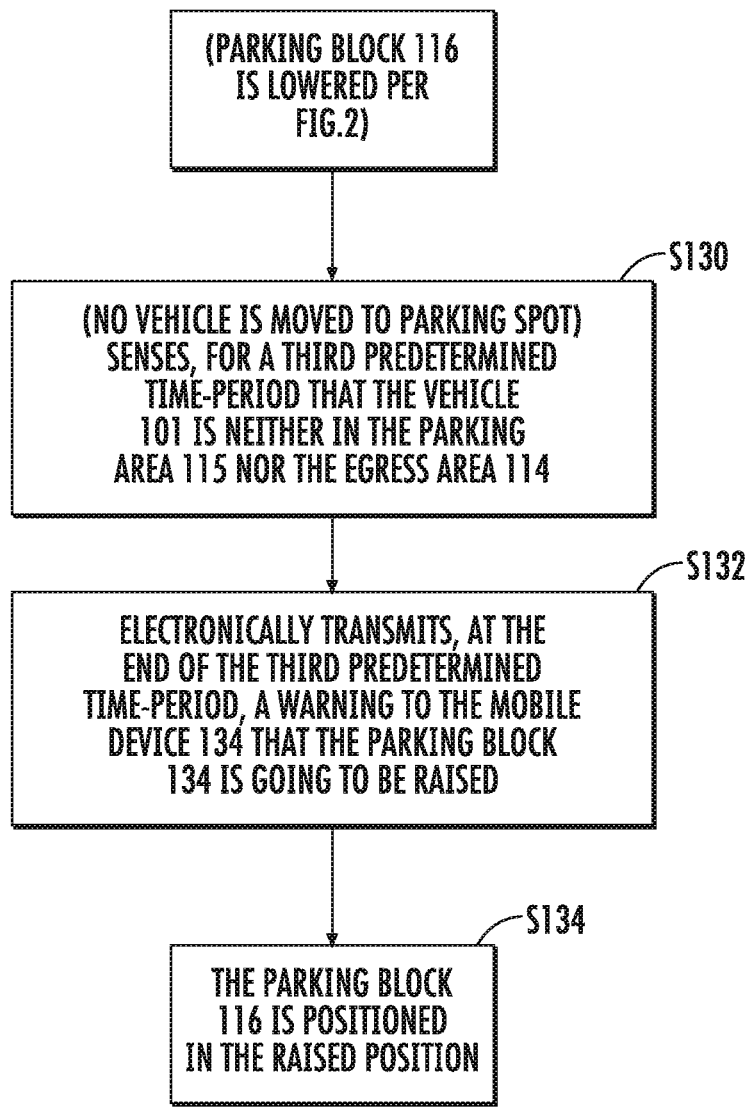
FIG. 4 illustrates a method for accommodating parking a guest of a hotel according to an embodiment.

Turning to FIG. 4, for a situation where the vehicle 101 is not moved to the parking spot when the parking block 116 in the lowered position, at S130 the parking block assembly 106 senses, for a third predetermined time-period, e.g., one (1) minute, that the vehicle 101 is neither in the parking area 115 nor the egress area 114. At S132 the parking block assembly 106 electronically transmits, at the end of the third predetermined time-period, a warning to the mobile device 134 that the parking block 134 is going to be raised. At S134 at the end of a fourth predetermined time-period, e.g., one (1) additional minute, the parking block 116 is positioned in the raised position.

As indicated, the parking block assembly 106 includes an audible alarm 154 controlled by the block controller 126. The audible alarm 154 is controlled to sound prior, e.g., momentarily prior, to positioning the parking block 116 in the raised position or lowered position. This could prevent damage to persons and property of guests and hotel staff.

The parking bock assembly 106 includes a sensor 155 controlled by the block controller 126, the sensor 155 measures either or both of biased movement or applied force, e.g., from intentional manipulation by an unauthorized party attempting to burgle the vehicle 101. The scissor lift 138 for the parking block 116 may include a spring 159 that allows the scissor lift 138 to be partially depressed. This movement of the parking block 116 may be detected by the sensor 155. The sensor 155 may be a button type that is momentarily depressed by the movement against the spring 159. Alternatively the sensor 155 may be a motion sensor or an accelerometer type that can detect movement.

The audible alarm 154 is controlled to sound upon a sensing a biased movement of the parking block 116 or applied force against the parking block assembly 106 that is larger than a predetermined threshold. For example, the alarm 154 will not sound from perturbations associated with a strong weather storm.

The parking block assembly 106 includes a third transceiver 156 controlled by the block controller 126. The third transceiver 156 is a wired or radio frequency transceiver. With the Ethernet transceiver 156, the parking block assembly 106 electronically communicates with the hotel logistics controller 142 over an Ethernet network 160 when a parking bock 116 is positioned in the raised or lowered position responsive to instructions from the parking application 148.

The parking block assembly 106 receives from the mobile device 134 an identity of the guest 102 using the parking application 148. The parking block assembly 106 communicates the identity of the guest 102 to the hotel logistics controller 142 over the Ethernet network 106 when communicates that a parking bock 116 is raised or lowered responsive to a command from the parking application 148. This would inform the hotel 104 when a guest 102 is seeking to leave prior to checking out. It would also inform the hotel 104 about the number of vacant spaces in the parking lot 108.

Upon the parking block assembly 106 sensing a vehicle 101 in the parking spot 110 for more than a fourth predetermined time-period, e.g. forty-eight (48) hours, the parking block assembly 106 electronically communicates a warning message to the hotel logistics controller 142 over the network 160. This could help hotel staff understand if a disabled vehicle is left in a spot. It could also alert hotel staff if a guest checked out and left the vehicle beyond an agreed upon timeframe. In such case, the hotel staff can plan with or without the guest to have the vehicle 101 removed.

The parking lot 108 includes a plurality of parking spots 110 each with a parking block assembly 106. The hotel logistics controller 142 authorizes a guest 102 to control a parking block assembly 106 for parking a vehicle 101 in a parking spot 110 only when not more than a predetermined number of other parking block assemblies 106, e.g., two other assemblies 106, have been controlled by the guest 102 to park a vehicle 101, unless at least one of the other parking block assemblies 106 has been further controlled to remove a vehicle for the guest. This prevents any guest 102 from parking more vehicles at the parking lot than desired by hotel management.

According to the above disclosure, each parking sport in a hotel is blocked by a parking block assembly. The assemblies have e.g., a Bluetooth chip inside, and these blocks can operated by existing hotel guest using a software application on their mobile devices. The above features will active, that is, be enabled in the guest mobile software application only when the guest reserves a room in that hotel, otherwise this feature will be in disabled mode. According the above disclose system, initially all parking blocks will be reserved or raised position. A guest arrives to a hotel parking area and finds an available slot to park the vehicle. When the guest vehicle comes near to the parking blocks, the block BTLE and Guest Mobile BTLE will advertise and communicate to with each other. Via the mobile device, the guest will request that the block be lowed. Then the car for the guest is parked, and automatically thereafter the block is raised once the car is parked. Similarly, while taking the vehicle out of the lot, the guest requests to lower the block and the guest removes the vehicle out from parking.

Once the vehicle is removed from the parking spot, the parking blocks is raised. With this system, a guest has control to operate parking spots at a hotel. Outsiders cannot park vehicles at the Hotel parking as they do not have the proper credentials. Parked vehicles are protected by the blocks so the vehicles are much less likely to be stolen. For example, if a third party were to try to manipulate the blocks manually, the block alarm will ring. If the guest having the parked vehicle checkout of the spot prior to checking out of the hotel, the hotel will be warned by automatic communications from the parking spot assembly. In addition, wrongly parked guest vehicles will result in an alert to the guest to park correctly.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A parking system for parking a vehicle of a vehicle operator, comprising:
    a parking block assembly disposed on parking lot, the parking lot including a parking spot for parking the vehicle, wherein the parking spot includes an egress area and a parking area and the parking block assembly is disposed in the egress area,
    the parking block assembly including:
        a parking block, and
        a lift mechanism supporting the parking block at the egress area, the lift mechanism positioning the parking block in a lowered position being proximate a ground level and a raised position being distal the ground level,
        a block controller, the block controller being an electronic controller that controls the lift mechanism to position the parking block in the lowered position and the raised position,
        a first sensor controlled by the block controller, the first sensor being a proximity sensor for sensing when a vehicle is in one more of the egress area and the parking area,
        a first transceiver controlled by the block controller, the first transceiver electronically communicating with a mobile device that is within range of the first transceiver, the mobile device being a mobile telecommunications device for the vehicle operator,
    wherein the parking block assembly receives authorized instructions to position the parking block in the lowered position from the mobile device of the vehicle operator, and thereafter positions the parking block in the lowered position,
    wherein:
    upon positioning the parking block in the lowered position, the parking block assembly senses vehicle is in the egress area for a predetermined time-period, and electronically transmits, at the end of the predetermined time-period, a warning to the mobile device that the vehicle is improperly positioned within the parking spot, and
    the parking block assembly includes an audible-alarm controlled by the block controller, and after sensing for a second predetermined time-period that the vehicle remains in the egress area, the parking block assembly sounds the audible alarm.

2. The system of claim 1, wherein the lift mechanism includes a base fixed to the egress area and a scissor lift connecting the base and the parking block.

3. The system of claim 1, where the first transceiver is a radio frequency (RF) transceiver that communicates with an RF transceiver in the mobile device.

4. The system of claim 3, where the first transceiver is a Bluetooth Low Energy (BTLE) transceiver that communicates with a BTLE transceiver in the mobile device.

5. The system of claim 4 including:
    a logistics controller, being an electronic controller that communicates with the mobile device, and
    a second transceiver controlled by the logistics controller, the second transceiver electronically communicating with the mobile device, the logistics controller transmitting credential data to the mobile device for processing on a parking application on the mobile device, the parking application being a software application that controls the parking block assembly; and
    wherein the authorized instructions are provided in advance to the mobile device by the logistics controller.

6. The system of claim 5, wherein the logistics controller is a hotel logistics controller for a hotel, the hotel logistics controller enables the parking application to control the parking block assembly when the hotel logistics controller verifies the vehicle operator has an active reservation in at least one room in the hotel.

7. The system of claim 6, wherein the hotel logistics controller disables the parking application from controlling the parking block assembly when the hotel logistics controller verifies the vehicle operator is without an active reservation of at least one room in the hotel.

8. The system of claim 7, wherein prior to receiving authorized instructions from the mobile device, the parking block assembly applies RF protocols to advertise to and initiate communication with the mobile device.

9. The system of claim 8, wherein upon positioning the parking block in the lowered position, the parking block assembly:
    senses that no vehicle is initially in the parking area,
    senses when the vehicle is in the parking area and not in the egress area, and
    positions the parking block in the raised position.

10. The system of claim 9, wherein upon positioning the parking block in the lowered position, the parking block assembly:

senses, for a third predetermined time-period, that the vehicle is neither in the parking area, nor the egress area, and electronically transmits, at the end of the second predetermined time-period, a warning to the mobile device that the parking block is going to be raised; and positioning, at the end of a third predetermined time-period, the parking block in the raised position.

11. The system of claim 8, wherein upon positioning the parking block in the lowered position, the parking block assembly:

senses that the vehicle is initially in the parking area, senses when the vehicle is in neither the parking area, nor the egress area, and positions the parking block in the raised position.

12. The system of claim 8, wherein the parking block assembly includes an audible alarm controlled by the block controller, the audible alarm is controlled to sound prior to positioning the parking block in the raised position or lowered position.

13. The system of claim 12, wherein the parking block assembly includes a sensor controlled by the block controller, the sensor measures either or both of biased movement or applied force and the audible alarm is controlled to sound upon a sensing biased movement or applied force above a predetermined threshold.

14. The system of claim 5, wherein the parking block assembly includes a third transceiver controlled by the block controller, the third transceiver being a wired or RF transceiver, wherein the parking block assembly electronically communicates with the logistics controller over an Ethernet network when a parking bock is positioned in the raised or lowered position responsive to receiving instructions from the parking application.

15. The system of claim 14, wherein the parking block assembly receives from the mobile device an identity of the vehicle operator using the parking application, and the parking block assembly communicates the identity of the vehicle operator to the logistics controller over the Ethernet network when communicating that a parking bock is raised or lowered responsive to a command from the parking application.

16. The system of claim 15, wherein upon the parking block assembly sensing a vehicle in the parking spot for more than a fourth predetermined time-period, the parking block assembly electronically communicates a warning message to the logistics controller over the network.

17. The system of claim 15, wherein the parking lot includes a plurality of parking spots each with a parking block assembly, and wherein the logistics controller authorizes a vehicle operator to control a parking block assembly for parking a vehicle in a parking spot only when not more than a predetermined number of other parking block assemblies have been controlled by the vehicle operator to park a vehicle, unless at least one of the other parking block assemblies has been further controlled to remove a vehicle.

18. A method for accommodating parking requirements of a vehicle operator parking a vehicle at a parking spot, comprising:

receiving, in a parking block assembly disposed in an egress area of a parking spot, authorized instructions from a mobile device of the vehicle operator to position a parking block in lowered position, positioning the parking block of the parking block assembly in the lowered position, and wherein the authorized instructions are provided to the mobile device in advance and enable control of the parking block assembly only during a duration of a stay at the parking spot for the vehicle, wherein:

upon positioning the parking block in the lowered position, sensing, by the parking block assembly, the vehicle is in the egress area for a predetermined time-period, and electronically transmitting, at the end of the predetermined time-period, a warning to the mobile device that the vehicle is improperly positioned within the parking spot, and after sensing for a second predetermined time-period that the vehicle remains in the egress area, sounding, by the parking block assembly, and audible alarm included in the parking block assembly.

\* \* \* \* \*